(12) United States Patent
Goto

(10) Patent No.: US 8,015,212 B2
(45) Date of Patent: Sep. 6, 2011

(54) REPRODUCTION METHOD, REPRODUCTION APPARATUS, AND RECORDING MEDIUM

(75) Inventor: Takeshi Goto, Saitama (JP)

(73) Assignee: Sony Corporation, Tokyo (JP)

( * ) Notice: Subject to any disclaimer, the term of this patent is extended or adjusted under 35 U.S.C. 154(b) by 180 days.

(21) Appl. No.: 11/373,111

(22) Filed: Mar. 13, 2006

(65) Prior Publication Data

US 2006/0212488 A1 Sep. 21, 2006

(30) Foreign Application Priority Data

Mar. 16, 2005 (JP) ................................. 2005-074664

(51) Int. Cl.
*G06F 7/00* (2006.01)
*G06F 17/30* (2006.01)
(52) U.S. Cl. ...................................... 707/802; 707/916
(58) Field of Classification Search .................. None
See application file for complete search history.

(56) References Cited

U.S. PATENT DOCUMENTS

| | | | | |
|---|---|---|---|---|
| 5,734,788 A * | 3/1998 | Nonomura et al. | ........... | 386/126 |
| 7,227,073 B2 * | 6/2007 | Kim | ................. | 84/609 |
| 7,296,064 B2 * | 11/2007 | Yoon et al. | ..................... | 709/217 |
| 2002/0078056 A1 * | 6/2002 | Hunt et al. | .................... | 707/100 |
| 2002/0082901 A1 * | 6/2002 | Dunning et al. | ................ | 705/10 |
| 2003/0135513 A1 * | 7/2003 | Quinn et al. | ................. | 707/102 |
| 2003/0221541 A1 * | 12/2003 | Platt | ................................. | 84/609 |
| 2003/0228130 A1 * | 12/2003 | Tanikawa et al. | ............... | 386/46 |
| 2004/0128286 A1 * | 7/2004 | Yasushi et al. | .................... | 707/3 |
| 2004/0252604 A1 * | 12/2004 | Johnson et al. | ............ | 369/47.22 |
| 2006/0233521 A1 * | 10/2006 | Takeda | ............................ | 386/95 |
| 2006/0288845 A1 * | 12/2006 | Gale | ............................... | 84/609 |
| 2007/0025194 A1 * | 2/2007 | Morse et al. | ................. | 369/30.1 |
| 2007/0061497 A1 * | 3/2007 | Takatsuka | ..................... | 711/100 |

FOREIGN PATENT DOCUMENTS

WO    WO 02/10878    2/2002

OTHER PUBLICATIONS

Rehm, Eric, Representing Internet Streaming Media Metadata using MPEG-7 Multimedia Description Schemes, 2000, ACM, p. 93-98.*
Pampalk et al., "Dynamic Playlist Generation Based on Skipping Behavior," Queen Mary, University of London, 2005.*

* cited by examiner

*Primary Examiner* — Kuen S Lu
*Assistant Examiner* — Rachel J Lee
(74) *Attorney, Agent, or Firm* — Oblon, Spivak, McClelland, Maier & Neustadt, L.L.P.

(57) ABSTRACT

To provide a reproduction method for enabling an automatic selection and reproduction of a music data suitable for a user's preference during the reproduction, for reproducing a contents data given with an attribute data, and having the steps of: reproducing a plurality of the contents data in a predetermined pattern successively; monitoring an execution of a predetermined input operation during reproducing the contents data; specifying an attribute data common to the plurality of the contents data, to which the input operation is not executed during the reproduction, when a number of the input operations exceeds a predetermined value; and reproducing a contents data given with the common attribute data.

31 Claims, 10 Drawing Sheets

FIG. 2

| | FILE NAME | ARTIST | ALBUM | MUSIC | GENRE | MUSIC COMPOSER | RELEASED YEAR | FILE PRODUCTION TIME | TRANSFER TIME |
|---|---|---|---|---|---|---|---|---|---|
| 1 | FN1 | AR1 | AL1 | T1 | JPOP | – | R1 | FP1 | FT1 |
| 2 | FN2 | AR2 | AL2 | T2 | JPOP | – | R2 | FP2 | FT2 |
| 3 | FN3 | AR2 | AL2 | T3 | JPOP | – | R3 | FP3 | FT3 |
| 4 | FN4 | AR3 | AL3 | T4 | POP | – | R4 | FP4 | FT4 |
| 5 | FN5 | AR3 | AL4 | T5 | POP | – | R5 | FP5 | FT5 |
| 6 | FN6 | AR3 | AL4 | T6 | POP | – | R6 | FP6 | FT6 |
| 7 | FN7 | AR4 | AL5 | T7 | CLASSICAL | – | R7 | FP7 | FT7 |
| 8 | FN8 | AR4 | AL6 | T8 | CLASSICAL | – | R8 | FP8 | FT8 |
| 9 | FN9 | AR4 | AL6 | T9 | CLASSICAL | – | R9 | FP9 | FT9 |
| 10 | FN10 | AR4 | AL6 | T10 | CLASSICAL | – | R10 | FP10 | FT10 |
| 11 | FN11 | AR4 | AL6 | T11 | CLASSICAL | – | R11 | FP11 | FT11 |
| 12 | FN12 | AR4 | AK6 | T12 | CLASSICAL | – | R12 | FP12 | FT12 |
| ... | ... | ... | ... | ... | ... | ... | ... | ... | ... |

ATTRIBUTE ITEM (FILE NAME, ARTIST)

ATTRIBUTE (AR4)

PTABLE

FIG. 6

| | FILE NAME | ARTIST | ALBUM | MUSIC | GENRE | MUSIC COMPOSER | RELEASED YEAR | FILE PRODUCTION TIME | TRANSFER TIME |
|---|---|---|---|---|---|---|---|---|---|
| 1 | FN1 | AR1 | AL1 | T1 | JPOP | – | R1 | FP1 | FT1 |
| 2 | FN2 | AR2 | AL2 | T2 | JPOP | – | R2 | FP2 | FT2 |
| 3 | FN3 | AR2 | AL2 | T3 | JPOP | – | R3 | FP3 | FT3 |
| 4 | FN4 | AR3 | AL3 | T4 | POP | – | R4 | FP4 | FT4 |
| 5 | FN5 | AR3 | AL4 | T5 | POP | – | R5 | FP5 | FT5 |
| 6 | FN6 | AR3 | AL4 | T6 | POP | – | R6 | FP6 | FT6 |
| 7 | FN7 | AR4 | AL5 | T7 | CLASSICAL | – | R7 | FP7 | FT7 |
| 8 | FN8 | AR4 | AL6 | T8 | CLASSICAL | – | R8 | FP8 | FT8 |
| 9 | FN9 | AR4 | AL6 | T9 | CLASSICAL | – | R9 | FP9 | FT9 |
| 10 | FN10 | AR4 | AL6 | T10 | CLASSICAL | – | R10 | FP10 | FT10 |
| 11 | FN11 | AR4 | AL6 | T11 | CLASSICAL | – | R11 | FP11 | FT11 |
| 12 | FN12 | AR4 | AK6 | T12 | CLASSICAL | – | R12 | FP12 | FT12 |
| ... | ... | ... | ... | ... | ... | ... | ... | ... | ... |

G (AR4)

PTABLE

FIG. 9

| | FILE NAME | ARTIST | ALBUM | MUSIC | GENRE | MUSIC COMPOSER | RELEASED YEAR | FILE PRODUCTION TIME | TRANSFER TIME |
|---|---|---|---|---|---|---|---|---|---|
| 1 | FN1 | AR1 | AL1 | T1 | JPOP | — | R1 | FP1 | FT1 |
| 2 | FN2 | AR2 | AL2 | T2 | JPOP | — | R2 | FP2 | FT2 |
| 3 | FN3 | AR2 | AL2 | T3 | JPOP | — | R3 | FP3 | FT3 |
| 4 | FN4 | AR3 | AL3 | T4 | POP | — | R4 | FP4 | FT4 |
| 5 | FN5 | AR3 | AL4 | T5 | POP | — | R5 | FP5 | FT5 |
| 6 | FN6 | AR3 | AL4 | T6 | POP | — | R6 | FP6 | FT6 |
| 7 | FN7 | AR4 | AL5 | T7 | CLASSICAL | — | R7 | FP7 | FT7 |
| 8 | FN8 | AR4 | AL6 | T8 | CLASSICAL | — | R8 | FP8 | FT8 |
| 9 | FN9 | AR4 | AL6 | T9 | CLASSICAL | — | R9 | FP9 | FT9 |
| 10 | FN10 | AR4 | AL6 | T10 | CLASSICAL | — | R10 | FP10 | FT10 |
| 11 | FN11 | AR4 | AL6 | T11 | CLASSICAL | — | R11 | FP11 | FT11 |
| 12 | FN12 | AR4 | AK6 | T12 | CLASSICAL | — | R12 | FP12 | FT12 |
| ... | ... | ... | ... | ... | ... | ... | ... | ... | ... |

G (80'S)

PTABLE

FIG. 10

| | FILE NAME | ARTIST | ALBUM | MUSIC | GENRE | MUSIC COMPOSER | RELEASED YEAR | FILE PRODUCTION TIME | TRANSFER TIME |
|---|---|---|---|---|---|---|---|---|---|
| 1 | FN1 | AR1 | AL1 | T1 | JPOP | — | R1 | FP1 | FT1 |
| 2 | FN2 | AR2 | AL2 | T2 | JPOP | — | R2 | FP2 | FT2 |
| 3 | FN3 | AR2 | AL2 | T3 | JPOP | — | R3 | FP3 | FT3 |
| 4 | FN4 | AR3 | AL3 | T4 | POP | — | R4 | FP4 | FT4 |
| 5 | FN5 | AR3 | AL4 | T5 | POP | — | R5 | FP5 | FT5 |
| 6 | FN6 | AR3 | AL4 | T6 | POP | — | R6 | FP6 | FT6 |
| 7 | FN7 | AR4 | AL5 | T7 | CLASSICAL | — | R7 | FP7 | FT7 |
| 8 | FN8 | AR4 | AL6 | T8 | CLASSICAL | — | R8 | FP8 | FT8 |
| 9 | FN9 | AR4 | AL6 | T9 | CLASSICAL | — | R9 | FP9 | FT9 |
| 10 | FN10 | AR4 | AL6 | T10 | CLASSICAL | — | R10 | FP10 | FT10 |
| 11 | FN11 | AR4 | AL6 | T11 | CLASSICAL | — | R11 | FP11 | FT11 |
| 12 | FN12 | AR4 | AK6 | T12 | | — | R12 | FP12 | FT12 |
| ... | ... | ... | ... | ... | ... | ... | ... | ... | ... |

G (NIGHT) — rows 1–3 (JPOP)
G (MORNING) — rows 7–11 (CLASSICAL)

PTABLE

REPRODUCTION METHOD, REPRODUCTION APPARATUS, AND RECORDING MEDIUM

CROSS REFERENCES TO RELATED APPLICATIONS

The present invention contains subject matter related to Japanese Patent Application JP 2005-74664 filed in the Japanese Patent Office on Mar. 16, 2005, the entire contents of which being incorporated herein by reference.

BACKGROUND OF THE INVENTION

1. Field of the Invention

The present invention relates to a reproduction method and a reproduction apparatus for selecting and reproducing a contents data successively, and a recording medium.

2. Description of the Related Art

Recently, due to improving a large capacity and a small size of a hard disk drive (HDD) or other recording medium and a compression technology of a music data (audio data), an enormous number of the music data is able to be stored into the recording medium in a portable reproduction apparatus, a personal computer, or other electronic device.

Such electronic device for example is provided with a function of automatically selecting and reproducing the music data stored into the HDD (referred to Japanese Unexamined Patent Application (Kokai) No. 2004-54023, for example).

SUMMARY OF THE INVENTION

In the electronic device described above, however, a lot of the music data in which a user has no interest is also stored in the HDD, so, when the device automatically reproduces the enormous amount of the music data stored in the HDD, the music data in which the user has no interest is also reproduced frequently.

The present invention is to provide a reproduction method and a reproduction apparatus enabling an automatic selection and reproduction of a contents data suitable for a user's preference.

According to an embodiment of the present invention, there is provided a reproduction method for reproducing a contents data given with an attribute data, the method having the steps of: reproducing a plurality of the contents data in a predetermined pattern successively; monitoring an execution of a predetermined input operation during reproducing the contents data; specifying an attribute data common to the plurality of the contents data, to which the input operation is not executed during the reproduction, when a number of the input operations exceeds a predetermined value; and reproducing a contents data given with the common attribute data.

According to an embodiment of the present invention, there is provided a reproduction apparatus reproducing a contents data given with an attribute data, the apparatus having: a reproduction unit reproducing a plurality of the contents data successively; an operation unit inputting a predetermined input operation; a control unit monitoring the input operation of the operation means during reproducing the contents data, specifying an attribute data common to a plurality of the contents data, to which the input operation is not executed during the reproduction, when the number of the input operations exceeds a predetermined value, and reproducing the contents data given with the common attribute data.

According to an embodiment of the present invention, there is provided a recording medium used to a reproduction apparatus reproducing a contents data given with an attribute data, the medium of recording data for: reproducing a plurality of the contents data in a predetermined pattern successively; monitoring an execution of a predetermined input operation during reproducing the contents data; specifying an attribute data common to the plurality of the contents data, to which the input operation is not executed during the reproduction, when a number of the input operations exceeds a predetermined value; and reproducing the contents data given with the common attribute data.

According to a reproduction method, a reproduction apparatus, and a recording medium in embodiments of the present invention, it is able to automatically select a contents data suitable for a user's preference for a reproduction.

BRIEF DESCRIPTION OF THE DRAWINGS

The above and other features of embodiments of the present invention will be apparent in more detail with reference to the accompanying drawings, in which:

FIG. 2 is a view for illustrating an attribute and an attribute item of a music data stored into an HDD shown in FIG. 1;

FIG. 6 is a view for illustrating a group defined by the audio reproduction apparatus shown in FIG. 1;

FIG. 9 is a view for illustrating other example of a group according to an embodiment of the present invention; and FIG. 10 is a view for illustrating other example of a group according to an embodiment of the present invention.

DESCRIPTION OF THE PREFERRED EMBODIMENTS

Preferred embodiments of an audio reproduction apparatus (a contents reproduction apparatus) according to the present invention will be described in more detail with reference to the accompanying drawings.

Note that, a music data will be applied as an example of a contents data in the present embodiment.

Figure 1:
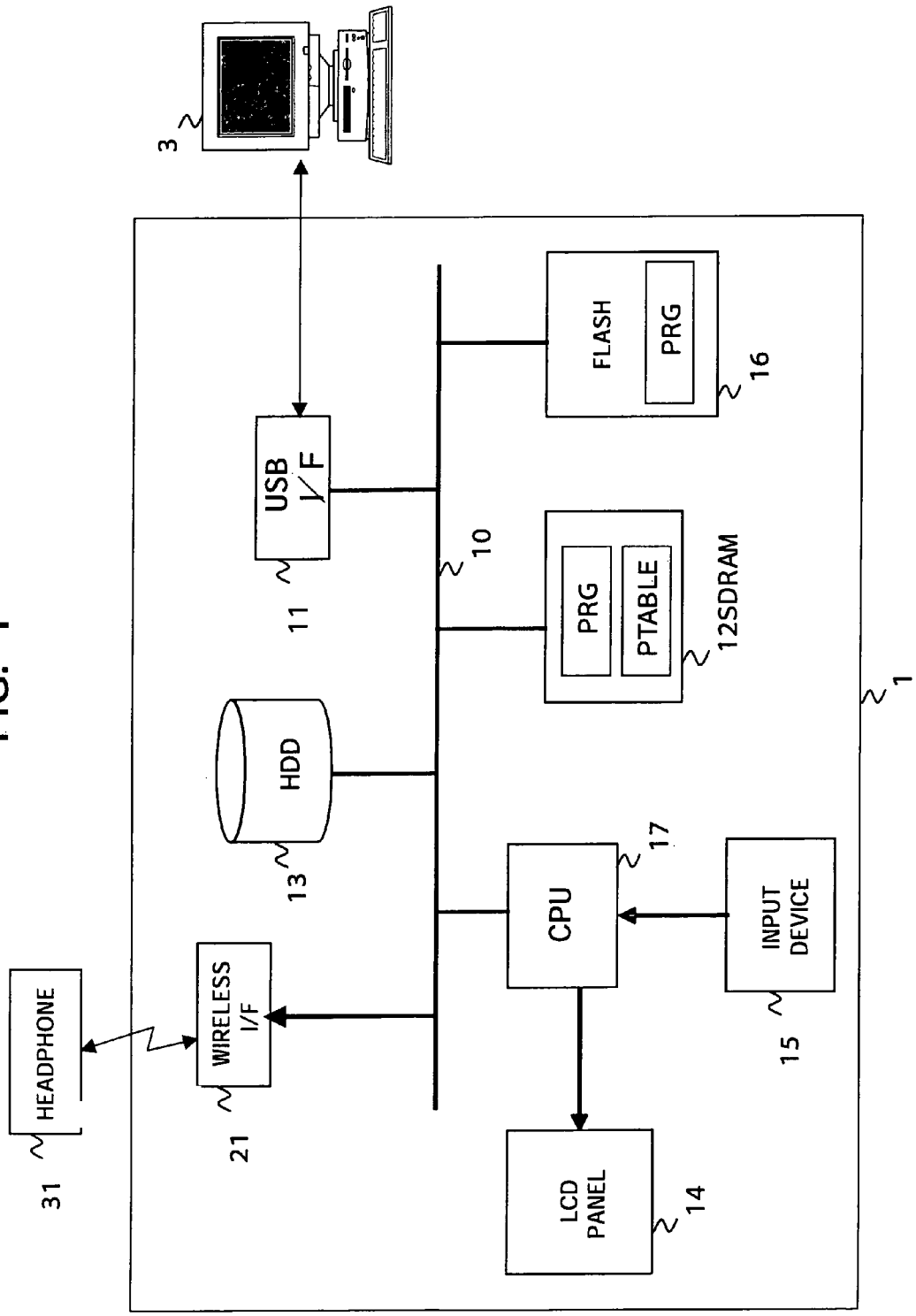
FIG. 1 is a schematic view illustrating a configuration of an audio reproduction apparatus according to an embodiment of the present invention.

FIG. 1 is a schematic view illustrating a configuration of an audio reproduction apparatus 1 according to an embodiment of the present invention.

(Audio Reproduction Apparatus 1)

As shown in FIG. 1, the audio reproduction apparatus 1 for example has a universal serial bus (USB) interface 11, a synchronous DRAM (SDRAM) 12, a hard disk drive (HDD) 13, a liquid crystal display (LCD) panel 14, an input device 15, a flash memory 16, a central processing unit (CPU) 17, and a wireless interface 21.

The USB interface 11, the SDRAM 12, the HDD 13, the flash memory 16, the CPU 17, and the wireless interface 21 for example are connected via a data line 10.

The USB interface 11 is connected to a personal computer 3 and performs with the personal computer 3 an input and output operation of data.

The SDRAM 12 temporarily stores data related to a processing of the CPU 17.

The HDD 13 stores a compressed music data.

The music data is written from the personal computer 3 through the USB interface 11 into the HDD 13.

The HDD 13 for example has a storage capacity of 20 GB and is capable of storing the music data for about 10 thousand tracks (700 compact disk's worth of data) compressed by for example adaptive transform acoustic coding (ATRAC) 3.

Each track's worth of the music data stored into the HDD 13 (hereinafter, referred to a music data, for simplification) is given with an attribute (an attribute data) related to an attribute items, such as a file name data, an artist data, an album data, a music title data, a genre data, a music composer data, a released year data, a file production time data, and a device transfer time data as shown in FIG. 2, which are described in an attribute management table data PTABLE.

In the present embodiment, the attribute data is not limited to a belonged ID3 tag and may be applied with a data designating a uniqueness of a contents data. For example, the attribute data may be designated with a tempo of a music as the attribute for example.

The attribute management table data PTABLE for example is stored into the SDRAM 12 shown in FIG. 1, and is suitably updated by the CPU 17.

The LCD panel 14 displays various screens by the CPU 17.

Main screens displayed on the LCD panel 14 are for example a music selection screen, a setting screen, and a reproduction screen, which are respectively replaced (transited) in response to a user's key operation.

The input device 15 is an operation unit such as a button for designating by a user a reproduction instruction, a reproduction stop instruction, a forward reproduction, a reverse reproduction, a skip (SKIP), a back skip (BSKIP), and a reproduction mode.

In the present embodiment, as the above reproduction mode, a shuffle mode for randomly selecting and reproducing a plurality of the music data is defined for example.

The flash memory 16 for example stores a program PRG in which an operation of the CPU 17 is defined.

The CPU 17 controls an operation of the audio reproduction apparatus 1 based on the program PRG read out from the flash memory 16, namely the CPU 17 performs a processing described in the present embodiment.

The CPU 17 reads out the selected music data from the HDD 13 and decodes the same, and outputs the resultant to the wireless interface 21.

In the present embodiment, the CPU 17 defines a single or a plurality of group to which the music data belongs in the respective music data stored in the HDD 13.

The CPU 17 for example defines a plurality of the group based on the attribute data to the music data stored in the HDD 13 based on the attribute item and the attribute shown in FIG. 2, and stores the data into the SDRAM 12.

The CPU 17, as later description, updates the above group when a predetermined condition is fulfilled, and updates the data stored in the SDRAM 12 in response to the above update.

In the present embodiment, the CPU 17 for example defines as the above group a newly-arrived group including as a contents a music data transferred from the personal computer 3 to the HDD 13 during a predetermined period, a group including as a contents a music data of the same artist or album, and a group including as a contents a music data of the same genre, released year, or keyword.

Note that, in the present embodiment, a group defined based on an attribute of date or other time factors is also referred to a time group.

The wireless interface 21 transmits to the headphone 31 by electromagnetic waves the decoded music data input from the CPU 17.

(Headphone 31)

Figure 3:
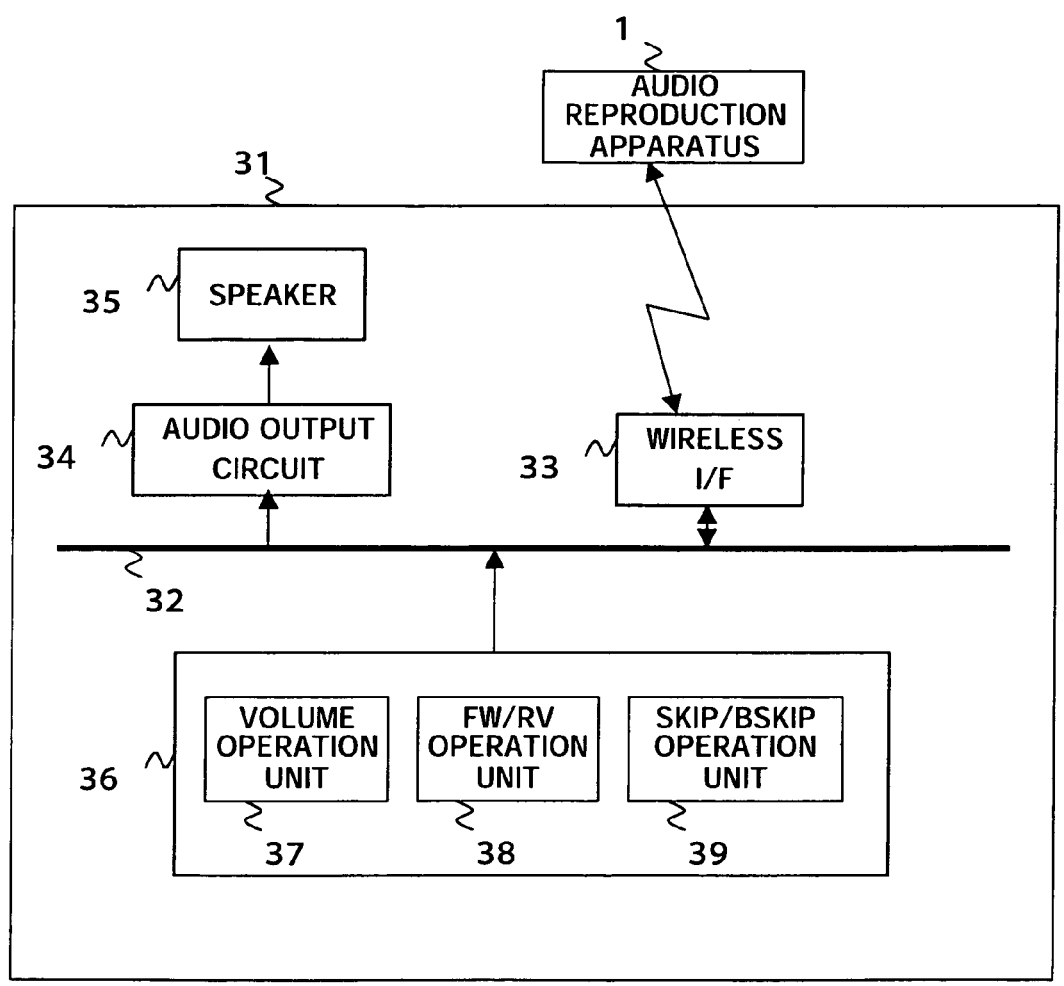
FIG. 3 is a view for illustrating a headphone shown in FIG. 1.

The headphone 31, as shown in FIG. 3, for example has a wireless interface 33, an audio output circuit 34, a speaker 35, and an operation unit group 36.

A data transmission among the wireless interface 33, the audio output circuit 34, and the operation unit group 36 is performed via a data line 32.

The wireless interface 33 receives by wireless signal the decoded music data transmitted by the wireless interface 21 of the audio reproduction apparatus 1 shown in FIG. 1, and outputs the same to the audio output circuit 34.

The audio output circuit 34 outputs to the speaker 35 an audio signal corresponding to the music data input from the wireless interface 33.

The speaker 35 has a left speaker and a right speaker, and outputs the audio signal input from the audio output circuit 34.

The operation unit group 36 for example has a volume operation unit 37, a forward reverse (FW•RV) operation unit 38, and a SKIP•BSKIP operation unit 39.

The volume operation unit 37 is used for controlling a volume of sound output from the speaker 35.

The forward reverse operation unit 38 is used for designating the forward reproduction or the reverse production.

The SKIP•BSKIP operation unit 39 is used for designating a music skip or a music back skip.

Blow, an automatic music selection operation based on a processing of the CPU 17 of the audio reproduction apparatus 1 shown in FIG. 1 will be described.

FIRST OPERATION EXAMPLE

Figure 4:
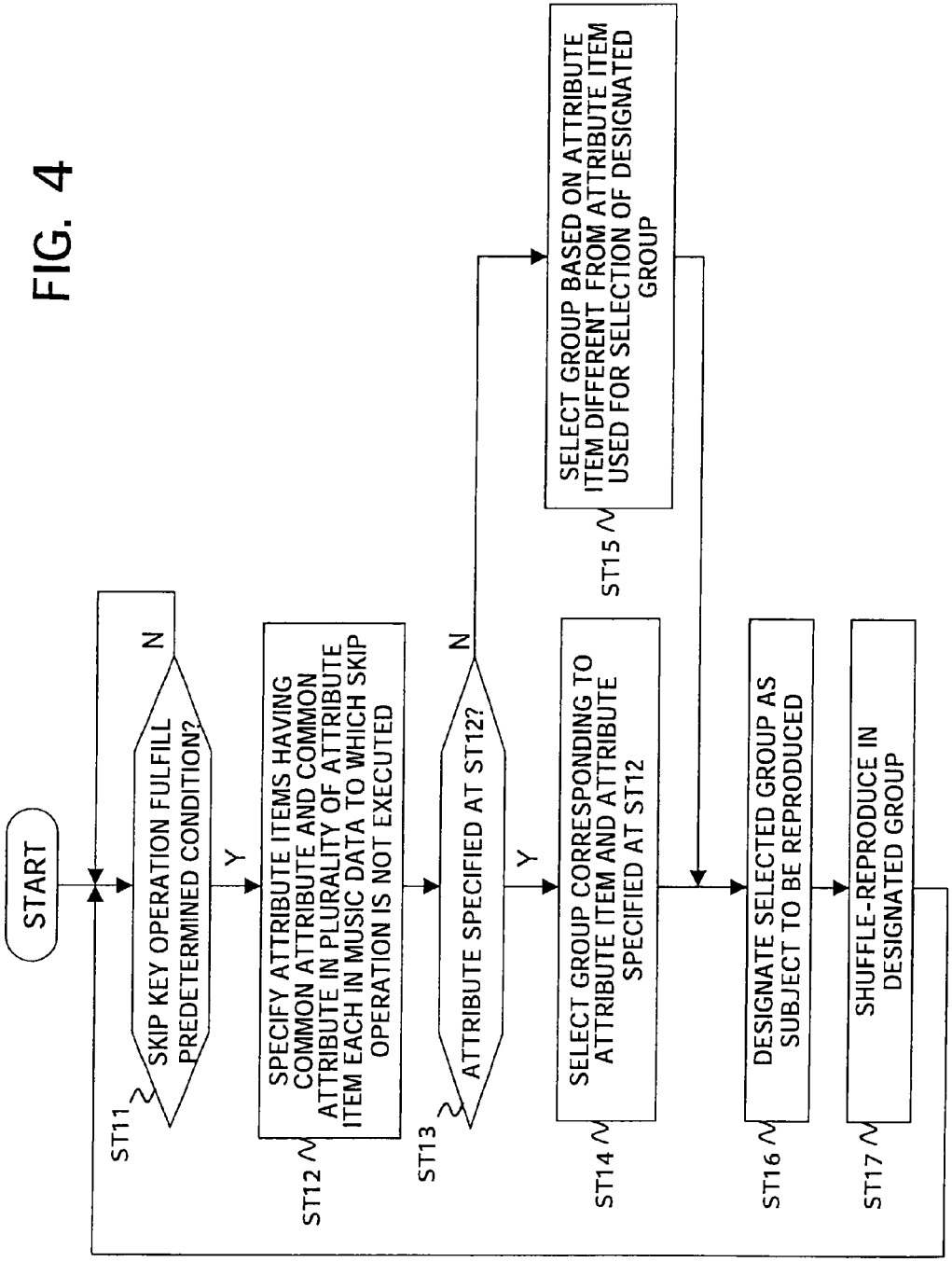
FIG. 4 is a flowchart for illustrating a first automatic reproduction operation of the audio reproduction apparatus shown in FIG. 1.

FIG. 4 is a flowchart for illustrating a first automatic reproduction operation of the audio reproduction apparatus 1 shown in FIG. 1.

Step ST11

The CPU 17 shown in FIG. 1 monitors a SKIP operation signal input via the wireless interface 21 based on an operation of the SKIP•BSKIP operation unit 39 shown in FIG. 3, and judges whether or not an input pattern of a SKIP instruction fulfills a predetermined condition.

The condition is for example a condition where a predetermined number of the SKIP instructions are input during a fullshuffled-pattern reproduction, or a condition where an input frequency of the SKIP instruction exceeds a predetermined reference value. The condition is for example defined to satisfy a user, who loses interest in the fullshuffled-pattern reproduction.

In the present embodiment, the CPU 17 randomly selects and reproduces the entire music data stored in the HDD 13 or a music data determined in advance during the fullshuffled-pattern reproduction.

The CPU 17 for example judges that the SKIP instruction is input when only predetermined ratio (for example, quarter) in the music is reproduced or a portion giving a deep impression to a person in the music is not reproduced after starting the reproduction of the music data.

The CPU 17 judges that the SKIP instruction is not input to the reproducing music data when a back SKIP instruction is input.

Step ST12

The CPU 17 for example compares an attribute data PRP of a plurality of the music data (the music data listened by a user), to which the SKIP instruction is not input, among a plurality of the music data of which a reproduction is started just before judging that the SKIP instruction fulfills the input condition at step ST11, and specifies a common attribute data and an attribute item data of the attribute data.

When the common attribute data is a predetermined artist, the attribute item data is artist.

Step ST13

When the CPU 17 judges that for example the attributes was specified at step ST12, it proceeds to step ST14, otherwise, when judging it is not, it proceeds to step ST15.

Step ST14

The CPU 17 selects a group corresponding to the attribute indicated by the specified attribute data, in an attribute item indicated by the attribute item data specified at step 12.

The group for example includes as a contents a plurality of the music data indicating the same attribute in a predetermined attribute item.

Step ST15

The CPU 17 selects in a predetermined reference an attribute item different from the attribute item used for selecting the group to be reproduced, and selects in a predetermined reference an attribute in the selected attribute item.

The CPU 17 selects the attribute item and the attribute randomly or based on a priority given to the group for example.

Then the CPU 17 selects the group corresponding to the selected attribute.

Step ST16

The CPU 17 designates the group selected at step ST14 or step ST15 as a subject to be reproduced.

Step ST17

The CPU 17 selects in the shuffled pattern a plurality of the music data belonging to the group designated at step ST16, reads out the selected music data from the HDD 13, and decodes the same.

The CPU 17 outputs the decoded music data to the wireless interface 21, which transmits to the headphone 31 by wireless signal the music data input from the CPU 17.

The headphone 31 receives the above music data by the speaker 35, and outputs an audio signal of the music data through the audio output circuit 34 to the speaker 35.

Figure 5:
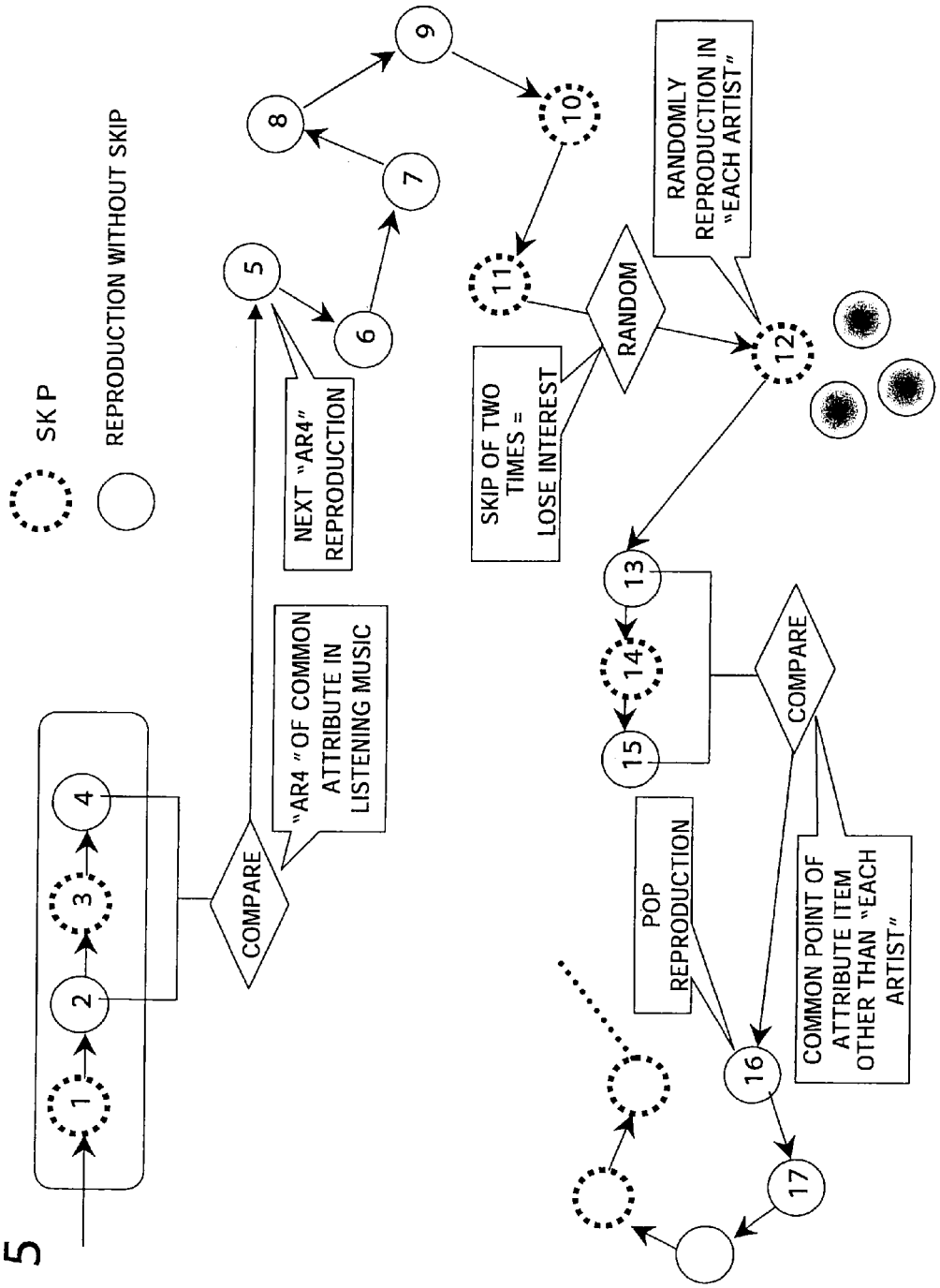
FIG. 5 is a view for illustrating an example of the automatic reproduction operation shown in FIG. 4.

FIG. 5 is a view for illustrating a first automatic music selection operation of the audio reproduction apparatus 1 shown in FIG. 1.

As shown in FIG. 5, the CPU 17 shown in FIG. 1 for example selects the music data in the fullshuffled pattern, and reproduces the music data [1], [2], [3] and [4] successively.

The CPU 17 receives a SKIP instruction by an operation of the SKIP•BSKIP operation unit 39 shown in FIG. 3 during reproducing the music data [1] and [3], and judges whether or not the SKIP instruction fulfills an input pattern condition determined in advance (step ST11 in FIG. 4).

The condition for example is a condition where a predetermined number of the SKIP instructions are input during the fullshuffled-pattern reproduction.

When judging the above condition is fulfilled, the CPU 17 compares an attribute data of the reproduced music data to which the SKIP instruction is not executed during the fullshuffled-pattern reproduction, and specifies a common attribute data (step ST12 in FIG. 4).

In the case illustrated in FIG. 5 for example, the CPU 17 compares the attribute data of the music data [2] and [4], and specifies for example an artist AR4 as a common attribute data.

The CPU 17 selects a group (AR4) including as a content the specified artist AR4 (step ST14 in FIG. 4), designates the same as a subject to be reproduced (step ST16 in FIG. 4), and starts the shuffled reproduction by applying a group G (AR4) shown in FIG. 6 as the subject.

Namely, the CPU 17 reads out from the HDD 13 the music data given with the specified common attribute data, and reproduces the same subsequent to a reproduction of the music data [4].

In an example illustrated in FIG. 5, the music data [5] to [11] of the artist AR4 is read out from the HDD 13 and reproduced.

As shown in FIG. 5, each in the successively reproduced music data [10] and [11], when the SKIP instruction is input, the CPU 17 randomly selects artists except for the artist AR4 from the artist of a classification item (step ST16 in FIG. 4).

As shown in FIG. 5, for example, the CPU 17 selects an artist AR5.

The CPU 17 selects a music data of the randomly selected artist in the shuffled pattern and reproduces the same (step ST17 in FIG. 4).

Then, the CPU 17 receives the SKIP instruction by an operation of the SKIP•BSKIP operation unit 39 shown in FIG. 3 during reproducing the music data [12] and [14], and judges whether or not the SKIP instruction fulfills the input pattern condition determined in advance.

The condition is for example a condition where a predetermined number of the SKIP instructions are input during reproducing the music data of a predetermined artist.

When judging the condition is fulfilled, the SKIP•BSKIP operation unit 39 selects the attribute items except for the artist, selects successively the music data of the attribute randomly selected in the selected attribute item, and reproduces the same.

In the example illustrated in FIG. 5, the CPU 17 successively reads out from the HDD 13 the music data for example where a genre is "pop", and reproduces the same.

SECOND OPERATION EXAMPLE

Figure 7:
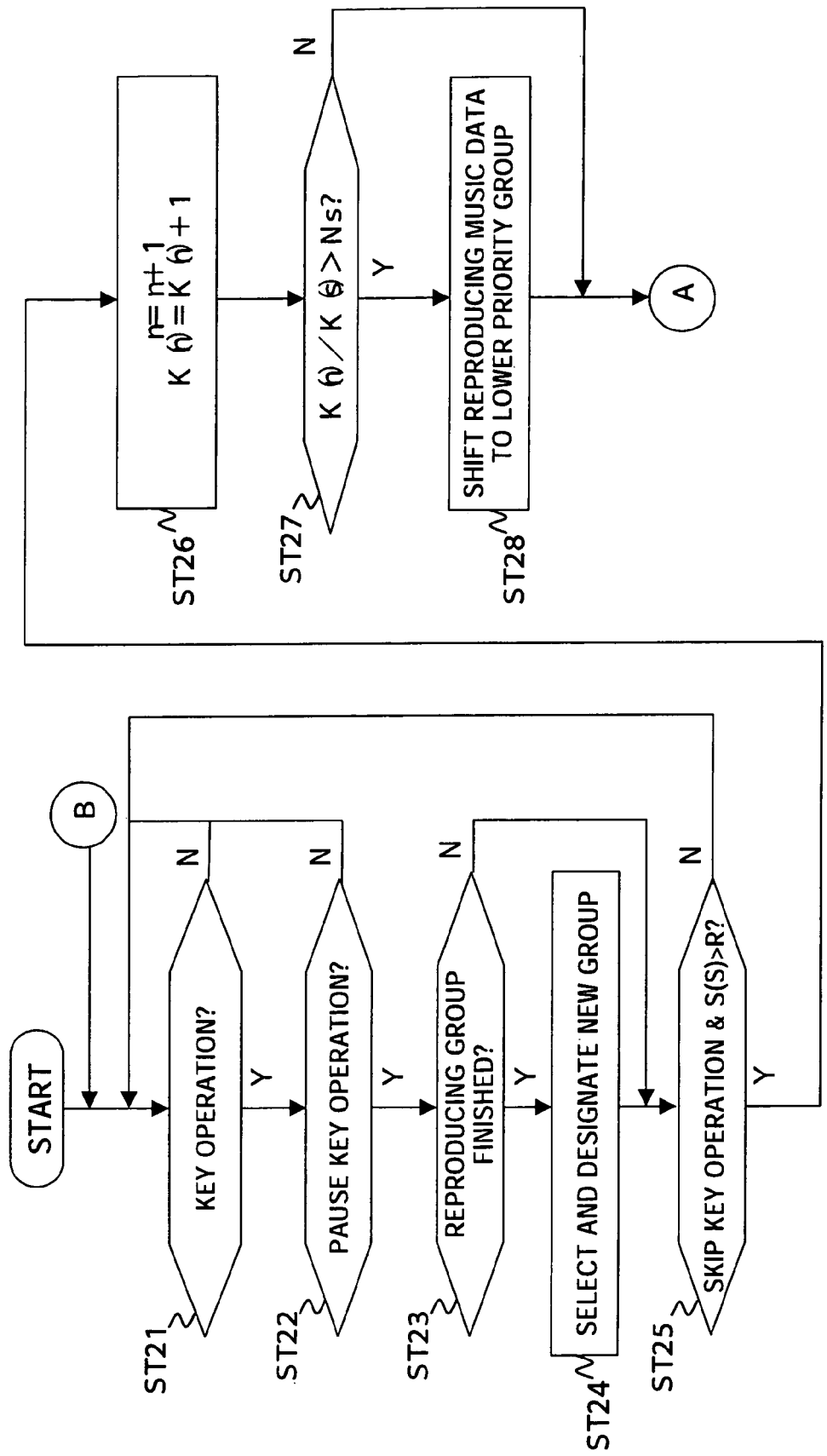
FIG. 7 is a view for illustrating a second automatic reproduction operation of the audio reproduction apparatus shown in FIG. 1.
Figure 8:
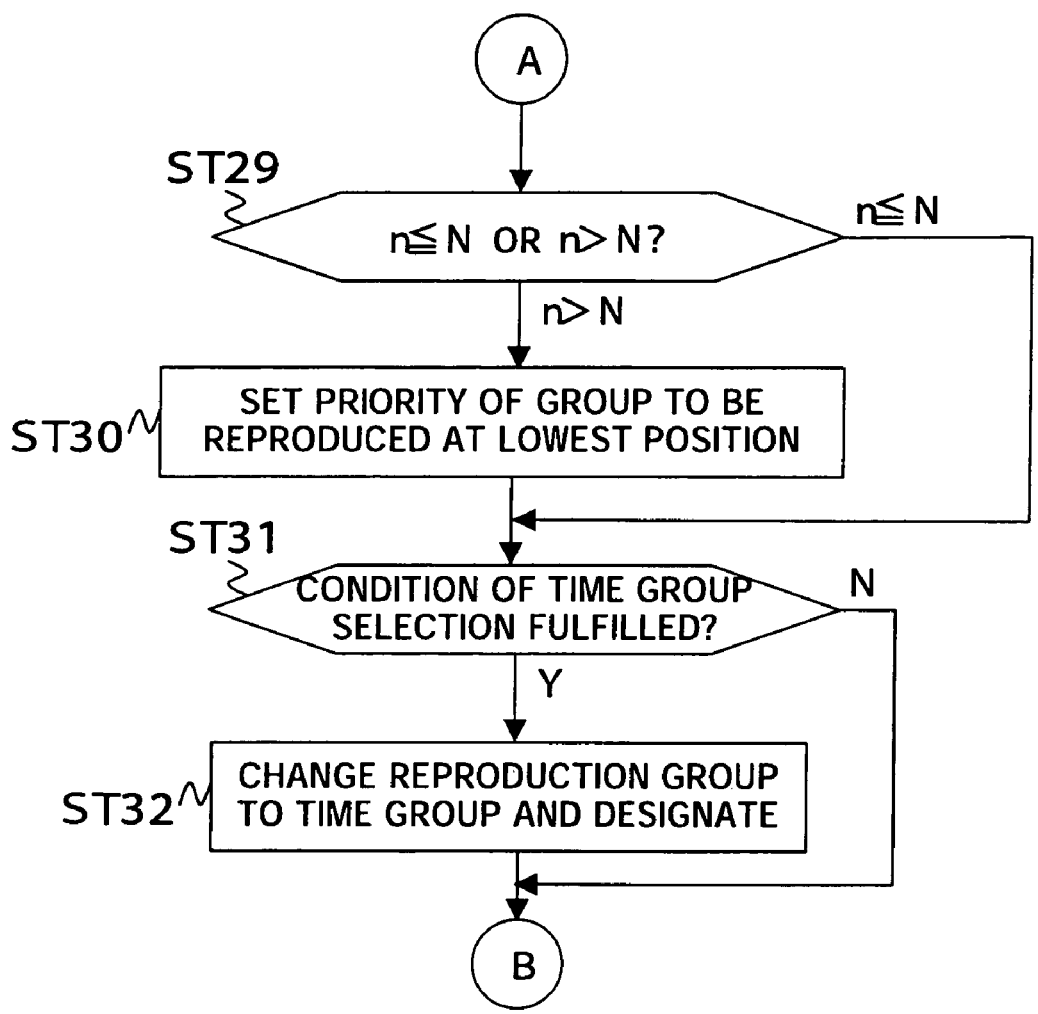
FIG. 8 is a view following FIG. 7 and for illustrating the second automatic reproduction operation of the audio reproduction apparatus shown in FIG. 1.

FIG. 7 and FIG. 8 are flowcharts for illustrating a second automatic reproduction operation of the audio reproduction apparatus 1 shown in FIG. 1.

The present operation example is also an operation example in the shuffled reproduction.

Step ST21

The CPU 17 shown in FIG. 1 monitors an operation signal from the input device 15 shown in FIG. 1 and an operation signal from the headphone 31 through the wireless interface 21, and, when judging some operation signal is input, proceeds to step ST22.

Step ST22

The CPU 17 performs a standby operation when the operation signal input at step ST11 is a PAUSE short press action, or performs a power-off operation and then returns to step ST21 when the operation signal is a PAUSE long press action.

Step ST23

When judging that the entire music data in the designated group is selected and reproduced as a subject to be shuffle-reproduced, the CPU 17 proceeds to step ST24, otherwise, when judging it is not, proceeds to step ST25.

Step ST24

The CPU 17 designates the following group as a subject to be reproduced.

In this case, the CPU 17 designates a group corresponding to other undesignated attribute in the attribute item used for the previous designation.

The CPU 17 may designate a group having the highest propriety in the undesignated groups based on the priority given to the group.

Step ST25

The CPU 17 judges whether or not the SKIP instruction is input by the operation of the SKIP·BSKIP operation unit 39 shown in FIG. 3, based on the operation signal input from the wireless interface 21.

When judging that the SKIP instruction is input, the CPU 17 specifies a reproduction ratio data S(s) indicating that how much ratio the reproducing music data is reproduced at a timing where the above SKIP instruction is input, based on the operation signal.

The CPU 17 judges whether or not the specified reproduction ratio data S(s) exceeds a predetermined threshold R.

When judging that the data S(s) exceeds the threshold R, the CPU 17 proceeds to step ST26, otherwise, when judging that it does not, it returns to step ST21.

Step ST26

The CPU 17 adds "1" into the number of skips in the reproducing group.

The CPU 17 adds "1" into a data K(n) indicating the number of skips in the past of the music data reproducing when the SKIP instruction is input.

Step ST27

The CPU 17 judges whether or not "K(n)/K(s)>Ns" is formed based on a data K(s) indicating the number of reproductions in the past of the music data reproducing when the SKIP instruction is input, the data K(n) generated at step ST26, and the predetermined threshold Ns, and proceeds to step ST28 when judging it is formed, otherwise it proceeds to step ST29 when judging it is not.

Step ST28

The CPU 17 transmits the reproducing music data from the designating group to a low priority group (a predetermined group) determined in advance.

The CPU 17 lowers a selection priority for the low priority group compared with other groups, or designates the group as a subject to be unselected in a group selection.

Step ST29

When judging that "n" is less than the maximum number of skips in the group, the CPU 17 proceeds to step ST31, otherwise it proceeds to step ST30 when judging it is not.

Step ST30

The CPU 17 sets a priority of the designating group at the lowest position.

The CPU 17 selects and designates a subsequent group having the highest priority, and performs a shuffled-reproduction of the group to be subjected.

The CPU 17 initializes "n" to be 0.

Step ST31

The CPU 17 judges whether or not a current time displayed by a timer in the audio reproduction apparatus 1 and a time indicated by the attribute data corresponding to a plurality of group hold in advance are matched, and proceeds to step ST32 when judging they are matched, otherwise it returns to step ST21 when judging they are not.

The time may be applied with for example Christmas Day, New Year's Day, and a user's birthday.

Step ST32

The CPU 17 designates a group corresponding to the attribute data judged that the times are matched at step ST31, and performs the shuffled-reproduction of the group to be subjected.

Note that, the group allocated with the attribute data indicating a time described above may be possible to be a lower priority group if a frequency of the SKIP instruction increases in the same way as other groups.

As described above, according to the audio reproduction apparatus 1, when the frequency of the SKIP instruction exceeds a reference during reproducing in a predetermined reproduction mode, a common attribute of the reproduced music data to which an effective SKIP instruction is not input is specified and the music data of the specified attribute is changed as a subject to be reproduced.

Namely, according to the audio reproduction apparatus 1, the apparatus learns an attribute of the music data suitable for a user's preference based on a user's SKIP instruction, and is able to automatically select the music data suitable for the user's preference and reproduce the same.

According to the audio reproduction apparatus 1, a group is defined based on the attribute of the music data and the change operation is performed by applying the group as a unit, so various groups suitable for the user's preference are defined, consequently, an automatic reproduction suitable for the same can be performed, and a processing load of the apparatus along an automatic music selection can be reduced.

According to the audio reproduction apparatus 1, the time group is defined based on a keyword and a released date of the music data, so a reproduction of the music data suitable for a season can be realized.

The present invention is not limited the above embodiment.

For example, the CPU 17 may perform a processing of step ST31 shown in FIG. 8 once, not every time, when reaching the processing of step ST31 at the predetermined number of times.

The CPU 17 may define as the time group in step ST32 for example a group (G) (80's) including as a contents a music data released in 80's as shown in FIG. 9.

The CPU 17 as shown in FIG. 10 may define a group G (night) including as a contents the music data where the genre are "J-pop" and "pop" and a group G (morning) including as a contents the music group where the genre is "classical", and select the group G (morning) at a predetermined condition in the forenoon and the group G (night) at a predetermined condition at night based on the attribute data corresponding to the current time data displayed by the timer and the groups (morning) and (night).

In the above embodiment, while the case is described that the CPU 17 selects and reproduces a plurality of the music data belonging to the selected group successively in the shuffled pattern, the music data may be selected and reproduced in the selected group for example successively in a predetermined order (an order from the beginning of a group list toward the end).

The CPU 17 may collect a music data where the frequency of the skip instruction is few (a predetermined frequency or less) to form a new play list (group), and manage the formed play list in the same way as other play lists.

In the above embodiment, while the case is described that the audio reproduction apparatus 1 selects and decodes a music to form a music data, which is transmitted to the headphone 31, a server at home having the same function as the audio reproduction apparatus 1 may be used instead of using the audio reproduction apparatus 1 and a client (for example, a personal computer) provided with a speaker may be used instead of using the headphone 31.

Further, a server on internet may be used instead of using the audio reproduction apparatus 1 and a personal computer provided with a speaker may be used instead of using the headphone 31.

The present invention can be applied to a data processing system for selecting and reproducing the music data successively.

It should be understood by those skilled in the art that various modifications, combinations, sub-combinations and alterations may occur depending on design requirements and other factors in so far as they are within scope of the appeared claims or the equivalents thereof.

What is claimed is:

1. A reproduction method comprising the steps of:
   (a) reproducing each of a plurality of contents data stored on a storage medium of a reproduction apparatus in a predetermined pattern successively, the plurality of contents data being all contents data stored on the storage medium or pre-selected contents;
   (b)(1) monitoring a number of occurrences of execution of a predetermined input operation during step (a);
   (b)(2) tracking a second number of occurrences of execution of the predetermined input operation monitored for each of the plurality of contents data during step (a);
   (c) specifying attribute data common to a subset of the plurality of contents data, to which the predetermined input operation is not executed during step (a), when the number of occurrences of execution of the predetermined input operations exceeds a first predetermined value;
   (d) reproducing using an output of the reproduction apparatus only the contents data having the specified common attribute data; and
   (e) forming a play list of another subset of the plurality of content data having the second number of occurrences of execution of the predetermined input operation that is less than a predetermined number.

2. A reproduction method as set forth in claim 1, further comprising the steps of:
   monitoring a number of occurrences of execution of the predetermined input operation during step (d); and
   reproducing only the contents data having attribute data different from the specified common attribute data when the number of occurrences of execution of the predetermined input operations during step (d) exceeds a second predetermined value.

3. A reproduction method as set forth in claim 1, wherein:
   the attribute data of the contents data includes a plurality of attribute items, and
   step (c) includes specifying an attribute item common to a subset of the plurality of the contents data not executed, and
   further comprising the steps of
   monitoring a number of occurrences of execution of the predetermined input operation during step (d); and
   reproducing only the contents data having an attribute item different from the specified common attribute item when the number of occurrences of execution of the predetermined input operations exceeds a second predetermined value.

4. A reproduction method as set forth in claim 1, wherein the predetermined input operation is an operation for skipping contents data.

5. A reproduction method as set forth in claim 1, wherein the contents data is audio data,
   the attribute data includes a plurality of attribute items, and
   an attribute item is one of an artist name, an album name, a music name, a genre, a music composer, a released year, a file production time, and a transfer time.

6. A reproduction method as set forth in claim 1, wherein, in step (d), the contents data having the specified common attribute data is randomly reproduced.

7. A reproduction method as set forth in claim 1, wherein the attribute data has an attribute indicating a time for reproducing the contents data, and
   in step (a), the contents data having the specified attribute data is reproduced when a current time displayed by a clock and the attribute data are matched.

8. A reproduction method as set forth in claim 1, further comprising the steps of:
   counting the number of occurrences of execution of the predetermined input operations during step (a); and
   changing a priority of a reproducing contents data at a point where the predetermined input operation is executed, when the counted number of occurrences of execution of the predetermined input operations exceeds a third predetermined value.

9. A reproduction method as set forth in claim 8, wherein the predetermined input operation is an input operation for skipping the contents data in step (a), and
   the step of changing the priority of the contents data sets the priority of the reproducing contents data at the point where the predetermined input operation is executed when the counted number of occurrences of execution of the predetermined input operations exceeds the third predetermined value.

10. A reproduction method as set forth in claim 8, wherein the plurality of contents data is classified into a plurality of subsets based on the attribute data, and
    the step of changing the priority of the contents data changes the priority of the subset belonging to the reproducing contents data at a point where the predetermined input operation is executed when the counted number of occurrences of execution of the predetermined input operations exceeds the third predetermined value.

11. A reproduction apparatus comprising:
    means for storing data;
    means for reproducing each of a plurality of contents data successively, the plurality of contents data being all contents data stored on the storage medium or pre-selected contents;
    operation means for inputting a predetermined input operation; and
    means for monitoring a number of occurrences of the predetermined input operation of the operation means during the reproduction of the plurality of contents data, means for tracking a second number of occurrences of execution of the predetermined input operation monitored for each of the plurality of contents data during the reproduction of the plurality of contents data, for specifying attribute data common to a subset of the plurality of contents data, to which the predetermined input operation is not executed during reproduction, when the number of occurrences of the predetermined input operations exceeds a predetermined value, for controlling reproduction such that only the contents data having the specified common attribute data are reproduced, and for forming a play list of another subset of the plurality of content data having the second number of occurrences of execution of the predetermined input operation that is less than a predetermined number.

12. A recording medium having stored thereon instructions for controlling a reproduction apparatus to implement steps for reproducing contents data, the steps comprising:
(a) reproducing each of a plurality of contents data stored on a storage medium in a predetermined pattern successively, the plurality of contents data being all contents data stored on the storage medium or pre-selected contents;
(b)(1) monitoring a number of occurrences of execution of a predetermined input operation during step (a);
(b)(2) tracking a second number of occurrences of execution of the predetermined input operation monitored for each of the plurality of contents data during step (a);
(c) specifying attribute data common to a subset of the plurality of contents data, to which the predetermined input operation is not executed during the step (a), when the number of occurrences of execution of the predetermined input operations exceeds a first predetermined value;
(d) reproducing only the contents data having the specified common attribute data; and
(e) forming a play list of another subset of the plurality of content data having the second number of occurrences of execution of the predetermined input operation that is less than a predetermined number.

13. A reproduction apparatus comprising:
a storage unit configured to store data;
a reproduction unit configured to reproduce each of a plurality of contents data successively, the plurality of contents data being all contents data stored on the storage medium or pre-selected contents;
an operation unit configured to input a predetermined input operation; and
a control unit configured to monitor the number of occurrences of the predetermined input operation of the operation unit during the reproduction of the plurality of contents data, to track a second number of occurrences of execution of the predetermined input operation monitored for each of the plurality of contents data during the reproduction of the plurality of contents data, to specify attribute data common to a subset of the plurality of contents data, to which the predetermined input operation is not executed during reproduction, when the number of occurrences of the predetermined input operations exceeds a predetermined value, only to control reproduction such that the contents data having the specified common attribute data are reproduced, and to form a play list of another subset of the plurality of content data having the second number of occurrences of execution of the predetermined input operation that is less than a predetermined number.

14. The recording medium as set forth in claim 12, further comprising the steps of:
monitoring a number of occurrences of execution of the predetermined input operation during step (d); and
reproducing only the contents data having attribute data different from the specified common attribute data when the number of occurrences of execution of the predetermined input operations during step (d) exceeds a second predetermined value.

15. The recording medium as set forth in claim 12, wherein:
the attribute data of the contents data includes a plurality of attribute items, and step (c) includes specifying an attribute item common to a subset of the plurality of the contents data not executed, and
further comprising the steps of
monitoring a number of occurrences of execution of the predetermined input operation during step (d); and
reproducing only the contents data having an attribute item different from the specified common attribute item when the number of occurrences of execution of the predetermined input operations exceeds a second predetermined value.

16. The recording medium as set forth in claim 12, wherein the predetermined input operation is an operation for skipping contents data in step (a).

17. The recording medium as set forth in claim 12, wherein the contents data is audio data,
the attribute data includes a plurality of an attribute items, and
an attribute item is one of an artist name, an album name, a music name, a genre, a music composer, a released year, a file production time, and a transfer time.

18. The recording medium as set forth in claim 12, wherein, in the step (d) the contents data having the specified common attribute data is randomly reproduced.

19. The recording medium as set forth in claim 12, wherein the attribute data has an attribute indicating the time for reproducing a contents data, and
in the step (a), the contents data having the specified attribute data is reproduced when a current time displayed by a clock and the attribute data are matched.

20. The recording medium as set forth in claim 12, further comprising the steps of:
counting the number of occurrences of execution of the predetermined input operations during step (a); and
changing a priority of a reproducing contents data at a point where the predetermined input operation is executed, when the counted number of occurrences of execution of the predetermined input operations exceeds a third predetermined value.

21. The recording medium as set forth in claim 20, wherein the predetermined input operation is an input operation for skipping the contents data in step (a), and
the step of changing the priority of the contents data sets the priority of the reproducing contents data at the point where the predetermined input operation is executed when the counted number of occurrences of execution of the predetermined input operations exceeds the third predetermined value.

22. The recording medium as set forth in claim 20, wherein the plurality of contents data is classified into a plurality of subsets based on the attribute data, and
the step of changing the priority of the contents data changes the priority of the subset belonging to the reproducing contents data at a point where the predetermined input operation is executed when the counted number of occurrences of execution of the predetermined input operations exceeds the third predetermined value.

23. The reproduction apparatus as set forth in claim 13, wherein the control unit is configured to monitor a number of occurrences of execution of the predetermined input operation, and to control reproduction such that only the contents data having attribute data different from the specified common attribute data when the number of occurrences of execution of the predetermined input operations exceeds a second predetermined value are reproduced.

24. The reproduction apparatus as set forth in claim 13, wherein:

the attribute data of the contents data includes a plurality of attribute items, and the control unit is configured to specify an attribute item common to a subset of the plurality of the contents data not executed, to monitor a number of occurrences of execution of the predetermined input operation, and to control reproduction such that only the contents data having an attribute item different from the specified common attribute item when the number of occurrences of execution of the predetermined input operations exceeds a second predetermined value.

25. The reproduction apparatus as set forth in claim 13, wherein the predetermined input operation is an operation for skipping contents data.

26. The reproduction apparatus as set forth in claim 13, wherein the contents data is audio data, the attribute data includes a plurality of attribute items, and an attribute item is one of an artist name, an album name, a music name, a genre, a music composer, a released year, a file production time, and a transfer time.

27. The reproduction apparatus as set forth in claim 13, the control unit is configured to randomly reproduce contents data having the specified common attribute data.

28. The reproduction apparatus as set forth in claim 13, wherein the attribute data has an attribute indicating a time for reproducing the contents data, and the control unit is configured to start reproduction of the contents data having the specified attribute data when a current time displayed by a clock and the attribute data are matched.

29. The reproduction apparatus as set forth in claim 13, wherein the control unit is configured to count the number of occurrences of execution of the predetermined input operations, and to change a priority of a reproducing contents data at a point where the predetermined input operation is executed, when the counted number of occurrences of execution of the predetermined input operations exceeds a third predetermined value.

30. A reproduction apparatus as set forth in claim 29, wherein the predetermined input operation is an input operation for skipping the contents data, and the control unit is configured to set the priority of the reproducing contents data at the point where the predetermined input operation is executed when the counted number of occurrences of execution of the input operations exceeds the third predetermined value.

31. A reproduction apparatus as set forth in claim 29, wherein the plurality of contents data is classified into a plurality of subsets based on the attribute data, and the control unit is configured to change the priority of the subset belonging to the reproducing contents data at a point where the predetermined input operation is executed when the counted number of occurrences of execution of the predetermined input operations exceeds the third predetermined value.

* * * * *